United States Patent [19]
Hollister

[11] 4,372,487
[45] Feb. 8, 1983

[54] HIGH PRESSURE OIL/GAS FIRED CLOSED LOOP FURNACE

[76] Inventor: Charles W. Hollister, 32 Wiltshire La., West Hartford, Conn. 06117

[21] Appl. No.: 211,329

[22] Filed: Nov. 26, 1980

[51] Int. Cl.³ ............................................. F24D 3/00
[52] U.S. Cl. ...................................... 237/56; 126/79; 122/20 B; 165/DIG. 12
[58] Field of Search ...................... 126/400, 110 R, 79; 122/20 B; 237/50, 55, 56; 110/234; 165/DIG. 12

[56] References Cited

U.S. PATENT DOCUMENTS

| | | | |
|---|---|---|---|
| 951,703 | 3/1910 | Sawyer | 126/79 |
| 2,026,399 | 12/1935 | Pierce | 122/20 B |
| 4,033,320 | 7/1977 | Jury | 126/110 R |
| 4,277,021 | 7/1981 | Daye | 126/110 R |
| 4,312,320 | 1/1982 | Jennings | 126/79 |

Primary Examiner—Albert J. Makay
Assistant Examiner—Henry Bennett
Attorney, Agent, or Firm—Wells & Wells

[57] ABSTRACT

Furnace structures having smoke and gas return are disclosed. The structures have a closed circuit combustion gas loop and a closed circuit liquid heat transfer loop. The two loops are circulated countercurrent to one another so that maximum heat transfer efficiency is achieved and exhaust emissions are reduced to a minimum.

6 Claims, 7 Drawing Figures

COMBUSTION GAS LOOP

WATER LOOP

HIGH PRESSURE OIL/GAS FIRED CLOSED LOOP FURNACE

CROSS-REFERENCE TO A RELATED APPLICATION

Applicant claims priority for Disclosure Document No. 89253, filed Mar. 20, 1980.

BACKGROUND OF THE INVENTION

The field of the invention is furnaces particularly furnace structures having smoke and gas return.

The invention relates to a furnace structure for generating heat with more particular attention paid to improving efficiency of heat transfer without decreasing burning efficiency below that of prior art furnaces.

Overall improvement in efficiency is gained by:

(a) combining water and gas loops as completely as physical conditions can accommodate;

(b) increasing the dwell time of the two fluids with each other;

(c) expansion of the exhaust gases to ambient pressure or below to assist in a rapid heat transfer capability in the heat exchanger;

(d) operating the burner at high pressure and high gas density to achieve a high heat density;

(e) reduction of the mass flow rate of gas to atmosphere to the amount consumed in near stoichiometric burning conditions;

(f) reduction of the temperature of the discharge exhaust gases to the atmosphere well below the point where the chimney will function; and (g) elimination of the chimney by providing a high pressure "blow-down" of exhaust gas to atmosphere to replace the chimney draft requirement.

None of the prior art furnace structures having smoke and gas return fulfill the above requirements.

SUMMARY OF THE INVENTION

Having in mind the limitations of the prior art, it is an object of the present invention to provide a furnace structure having a closed heating system.

Another object of the present invention is a high pressure, high gas density and expansion furnace structure system.

Still other objects of the present invention are furnace structures which are compact and at the same time efficient.

A further object of the present invention is a furnace structure which reduces environmental pollution by the reduction of exhaust gas mass and temperature.

These objects are accomplished in the present invention by a furnace structure having separate exhaust gas and water closed loops which are contiguous to each other and permit high heat transfer efficiency. Separate electric motor driven pumps are employed as the motivating force in each loop.

The furnace structure includes a cylindrical enclosed burner chamber centrally mounted into and series connected to an expansion heat exchanger. A nearly stoichiometric mixture of fuel and air is injected and burned at high pressure (above 100 psig) in the burner chamber. The exhaust gas leaving the heat exchanger at or below atmospheric pressure is conducted to an exhaust pump which increases its pressure to a value in excess of 100 psig (pounds per square inch gauge) and delivers it to an accumulator gas storage compartment. From the accumulator the exhaust gas is applied to a manifold surrounding the head of the burner thence through properly sized ports in the burner wall where it mixes with freshly burning fuel-air mixture completing the loop. A preset relief valve arranged to discharge exhaust gas to atmosphere is placed between the accumulator and the burner head allowing blow-down of excess gas which accumulates during the firing cycle.

Standard convectors mounted about a dwelling as required for heating and series connected provide cold water heat exchange return to an electric motor driven water circulating pump which delivers the water to a water jacket surrounding the gas storage portion of the accumulator. From the accumulator the water is delivered to the heat exchanger where it circulates radially inward through a series of concentric baffles washing the exterior of the finned gas tubes absorbing heat delivered by the expanding cooling gas. After passing the innermost series of tubes the water makes its final pass around the burner outer wall and is returned as hot water heating medium to the convectors completing the loop.

This system of two loops is optimized to combine good burning efficiency with greatly improved heat transfer efficiency with reduced mass quantity and temperature discharge to the atmosphere.

BRIEF DESCRIPTION OF THE DRAWINGS

The present invention is further described by reference to the appended drawings showing specific embodiments of the present invention, wherein.

DESCRIPTION OF THE PREFERRED EMBODIMENTS

Figure 1:
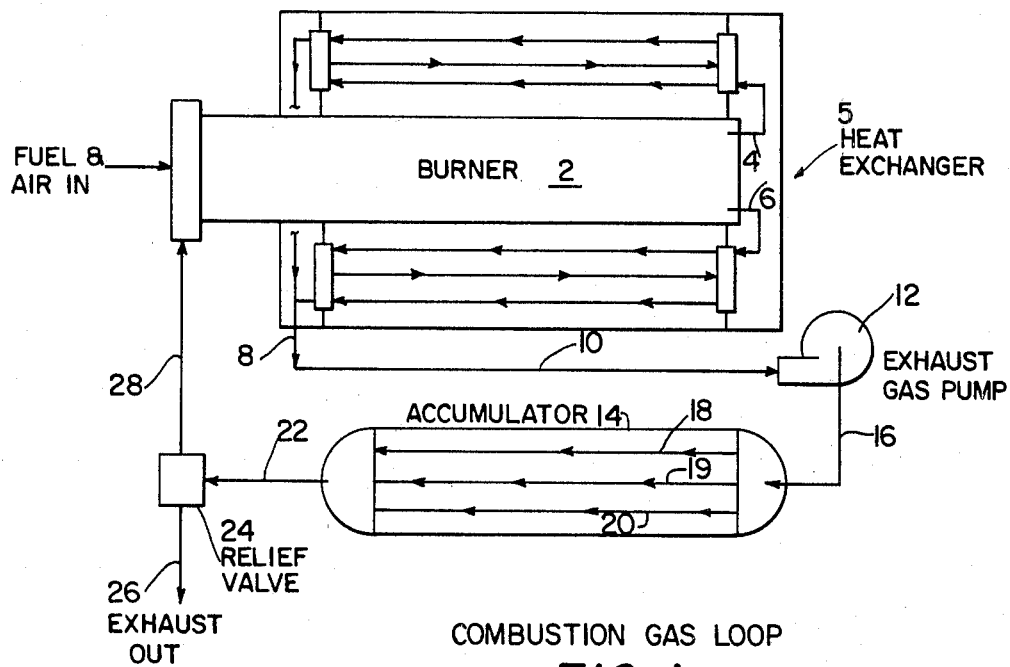
FIG. 1 is a schematic representation of the combustion gas loop of the present invention.

The combustion gas loop is discussed with particular reference to FIG. 1. A fuel and air mixture is introduced into burner 2 and the products of combustion exit by lines 4 and 6 to outlet 8. The outlet gases from 8 are circulated through line 10 to exhaust gas pump 12 from which they enter accumulator 14 by line 16.

Compressed exhaust gases pass through accumulator 14 through lines 18-20 and exit through line 22 to relief valve 24 where a portion of the exhaust gases exits to the atmosphere through line 26 and another portion is returned to burner 2 by line 28.

Figure 2:
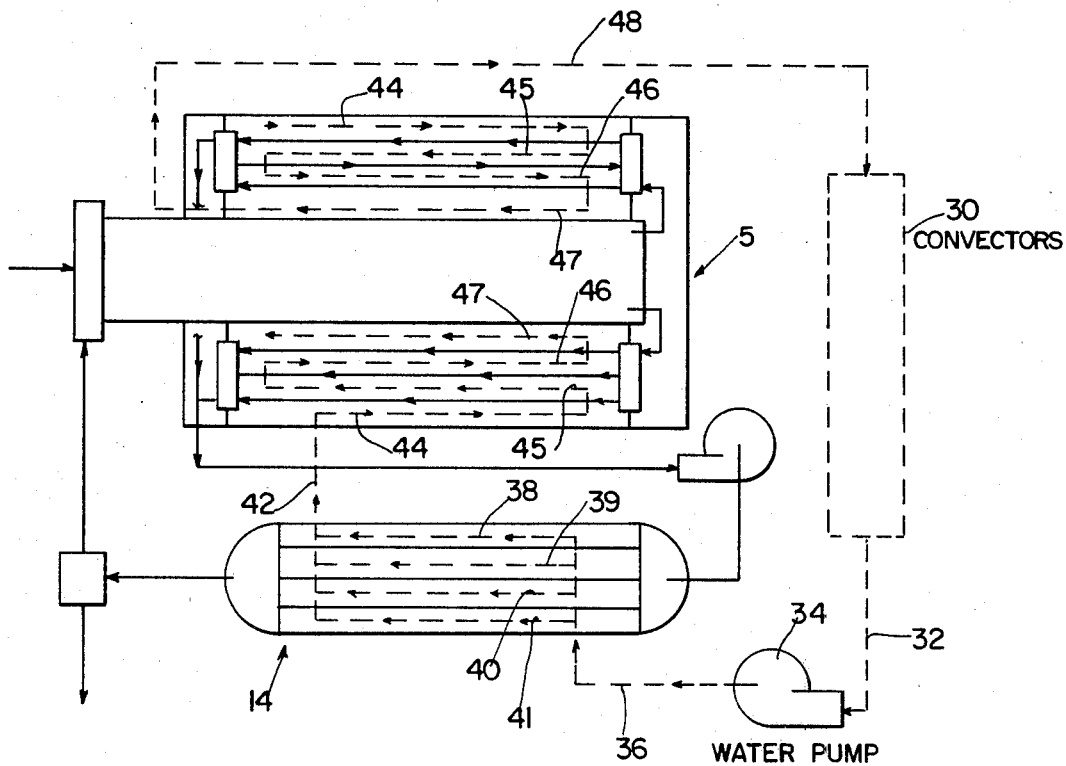
FIG. 2 is a schematic representation of the countercurrent liquid heat transfer medium loop of the present invention showing the liquid heat-transfer medium in dotted lines.

FIG. 2 shows the water loop superimposed upon the combustion gas loop wherein water or other heat exchange medium is passed from convectors 30 through line 32 (shown dotted to distinguish the heat exchange lines from the gas exchange lines) to water pump 34. From pump 34 the heat transfer medium is circulated into accumulator 14 by line 36 and then the heat transfer medium passes through lines 38-41. From the accumulator 14 the heat transfer medium passes through line 42 into heat exchanger 5 wherein it circulates through lines 44-47 and exits through line 48 to return to the convectors 30.

Figure 3:
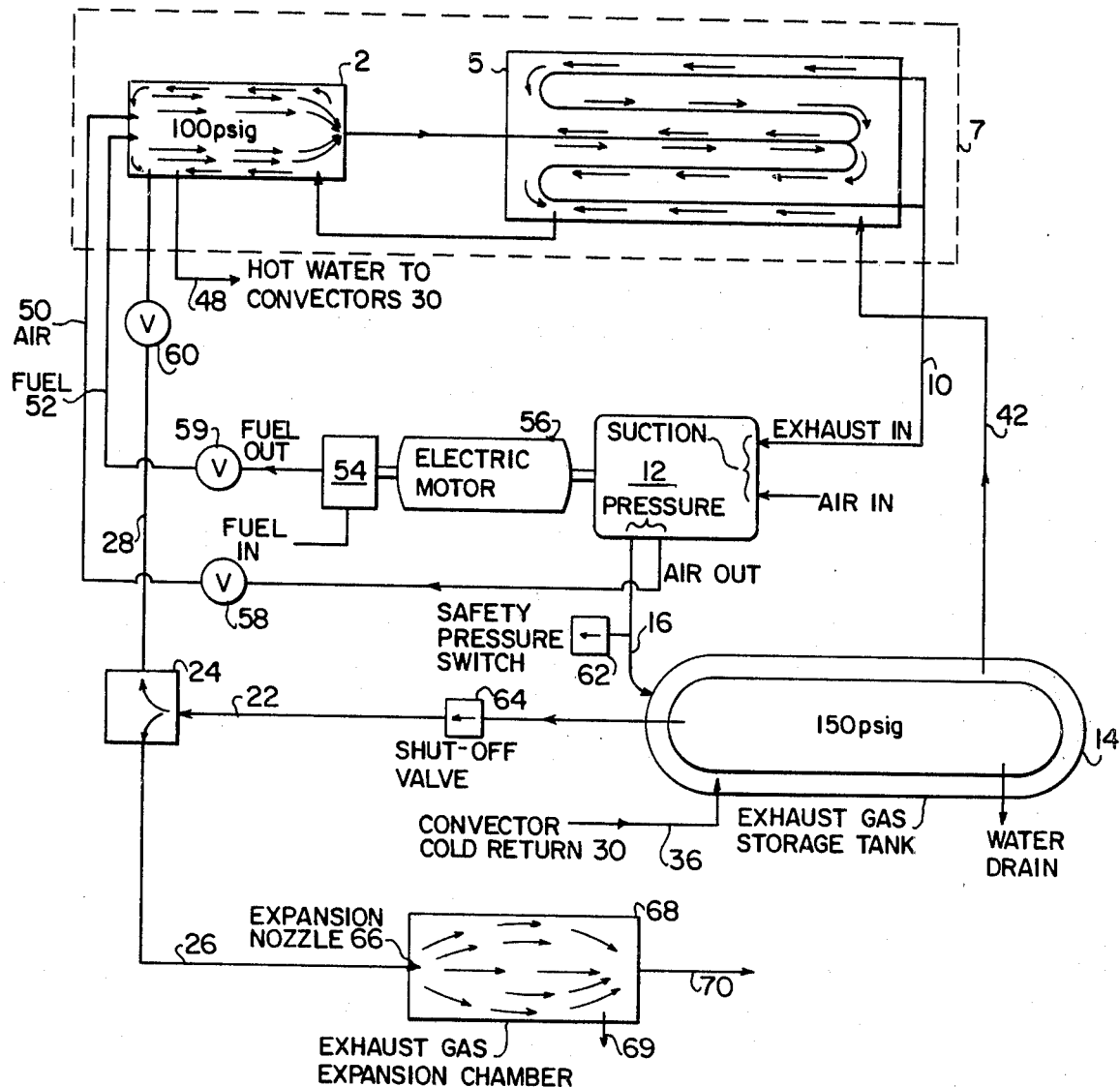
FIG. 3 is a flow diagram showing one embodiment of the present invention.

In FIG. 3 the burner or combustion chamber 2 and the heat exchanger 5 are drawn separately for schematic clarity. The burner 2 and heat exchanger 5 are contained in a housing 7.

Air enters the burner 2 from line 50 and fuel gas or fuel oil enters through line 52. Exhaust gas pump 12 is shown in FIG. 3 in the form of two rotary or piston type gas compressors for compressing both exhaust gas and incoming air. Both the gas compressors and gear fuel pump 54 can be operated by an electric motor 56 and pressurized air and fuel are controlled by regulators 58 and 59, respectively. Recirculated exhaust gas from line 28 is controlled by regulator 60.

There is a safety pressure switch 62 in compressed exhaust gas line 16 and a shut off valve 64 in line 22. Exhaust gas passing through line 26 is expanded by expansion nozzle 66 into expansion chamber 68 where liquids are drained off at 69 and the expanded gases are exhausted through line 70 to a chimney or pollution control system.

Figure 4:
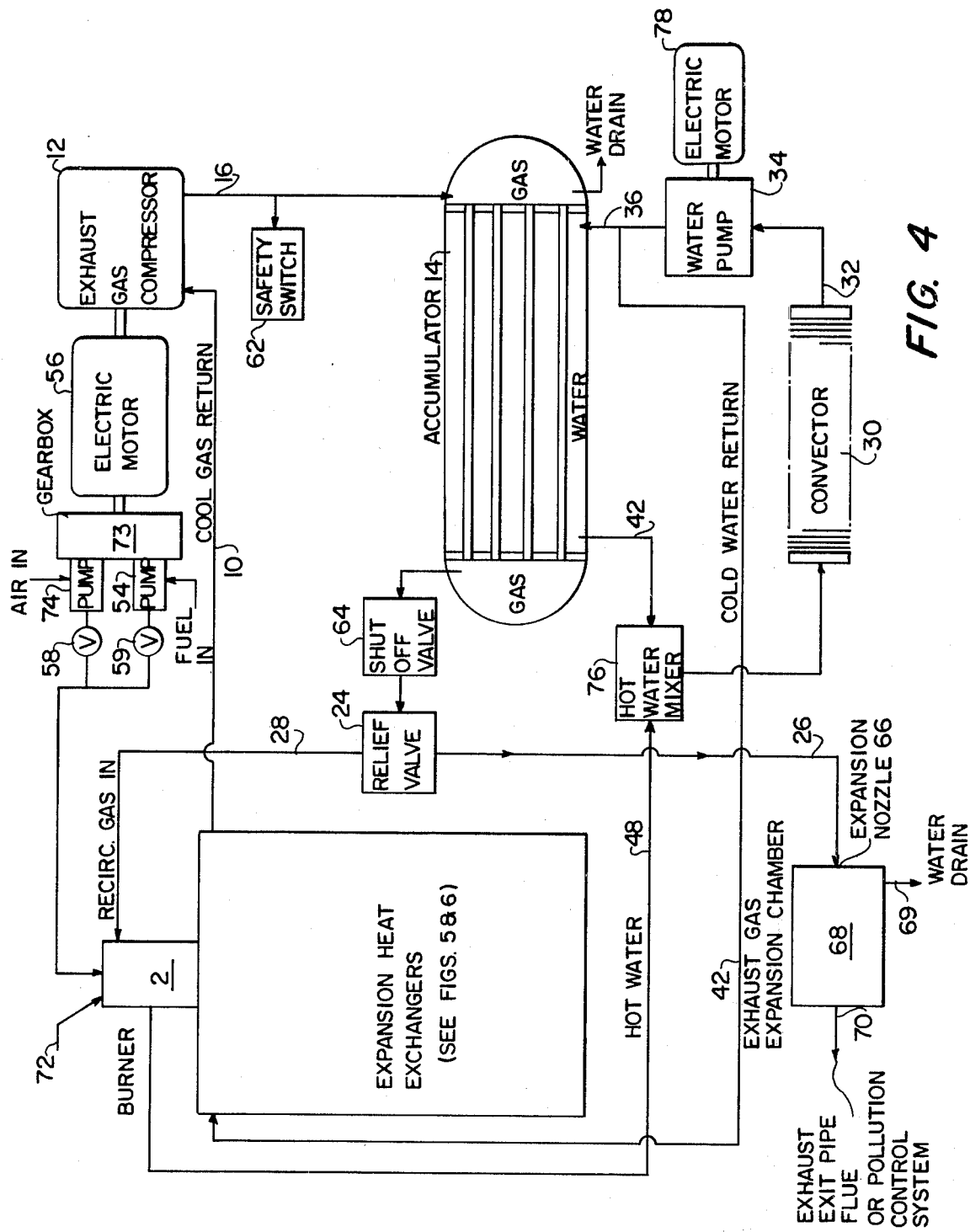
FIG. 4 is a flow diagram showing another embodiment of the present invention.
Figure 5:
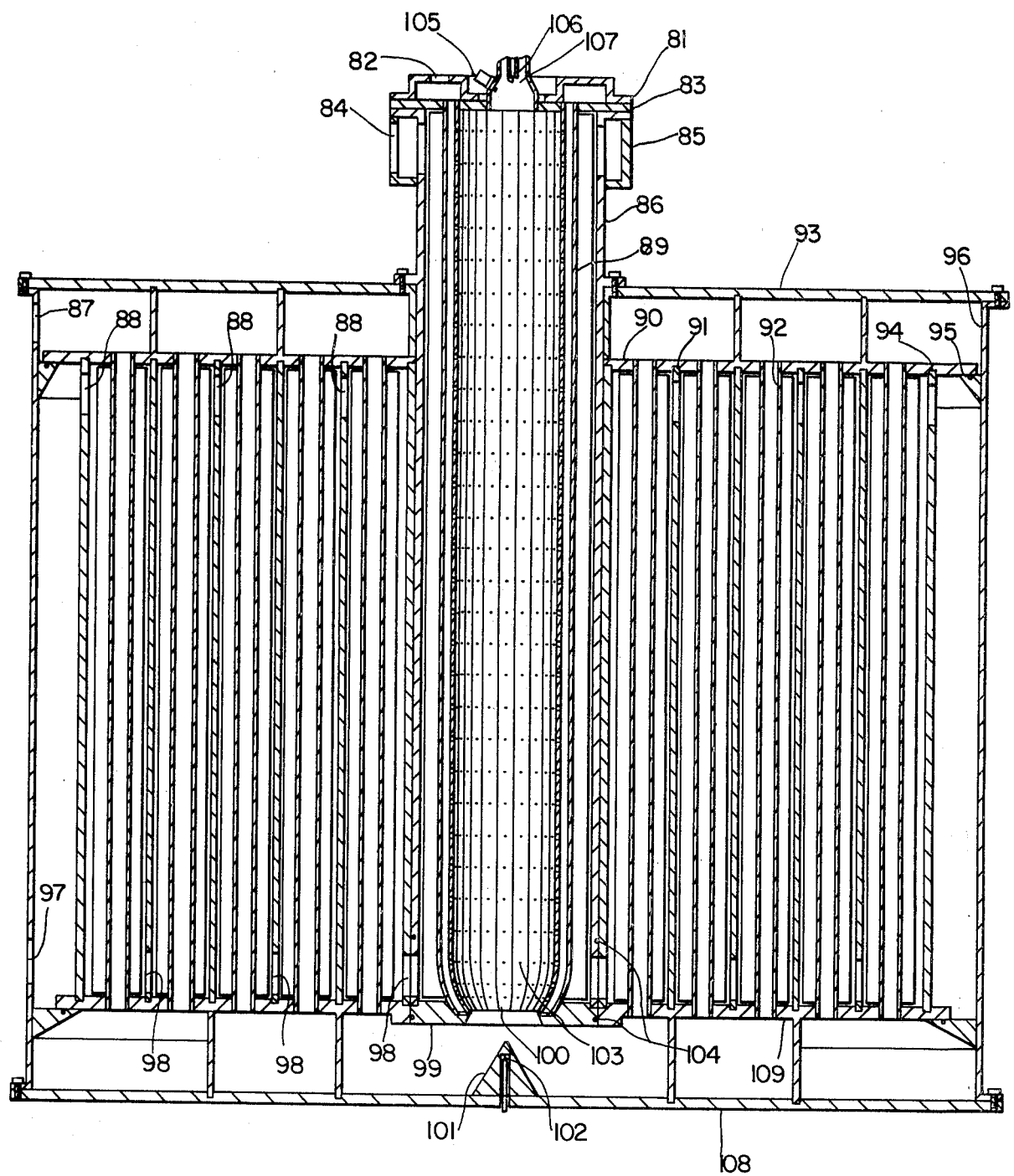
FIG. 5 is an elevation view in crosssection of one embodiment of the furnace structure of the present invention showing the combustion chamber and heat exchangers.
Figure 6:
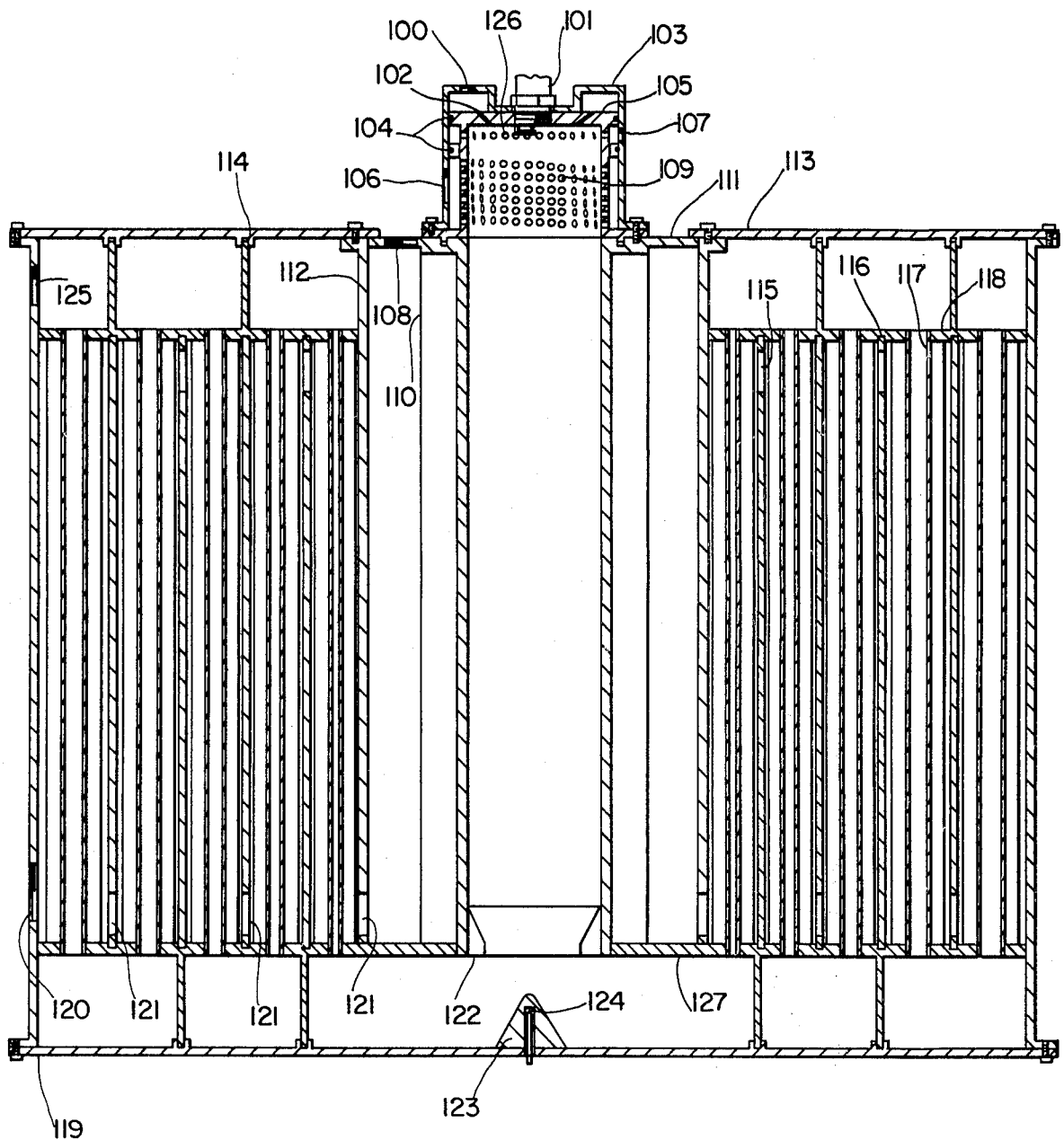
FIG. 6 is an elevation view in crosssection of another embodiment of the furnace structure of the present invention showing the combustion chamber and heat exchangers.

FIG. 4 illustrates how the furnace structures of FIGS. 5 and 6 can be incorporated into an overall heating system. Elements of the embodiment of the system shown in FIG. 4 which are not shown in FIGS. 1-3 include an igniter or spark plug 72, a gear box 73 for operating an air pump 74 and fuel pump 54 at the same time, a hot water mixer 76 to combine the output of lines 42 and 48 and an electric motor 78 for operating water pump 34.

The burner and heat exchange structure of FIG. 5 has the following elements:
Burner recirculating exhaust gas manifold 81,
Recirculating exhaust gas inlet port 82,
Burner heat plate 83,
Hot water exit port (to convectors) 84,
Hot water manifold 85,
Burner outer wall 86,
Heat exchanger gas exit 87,
Heat exchanger baffle water ports 88,
Burner inner wall tube structure 89,
Heat exchanger top plate 90,
Heat exchanger baffle 91,
Heat exchanger finned, gas to water transfer tubes 92,
Top cover 93,
Heat exchanger outer baffle wall 94,
Seal 95,
Containment vessel housing 96,
Cold water return (from convectors) 97,
Heat exchanger baffle water ports 98,
Nozzle end plate 99,
Choked nozzle 100,
Flow diverter cone and thermocouple housing 101,
Thermocouple 102,
Burner exhaust gas inlet ports 103,
Piston ring seals 104,
Spark plug 105,
Fuel nozzle 106,
Air passage 107,
Bottom housing cover 108, and
Bottom plate 109.

The burner and heat exchange structure of FIG. 6 has the following elements:
Burner air inlet port 100,
Spark plug 101,
Burner air passages (ports) 102,
Burner head manifold 103,
Piston ring seals 104,
Burner head 105,
Ricirculating exhaust gas inlet port 106,
Burner fuel inlet port 107,
Burner heat exchanger hot water exit port 108,
Burner exhaust gas inlet swirler ports 109,
Mixing chamber external fins 110,
Mixing chamber 111,
Mixing chamber, heat exchanger baffle 112,
Heat exchanger top cover 113,
Seal 114,
Heat exchanger baffle water ports 115,
Heat exchanger baffle 116,
Heat exchanger finned gas tubes 117,
Heat exchanger top plate 118,
Heat exchanger bottom cover 119,
Cold water return inlet port 120,
Mixing chamber choked nozzle insert 121,
Flow diverter cone and thermocouple housing 122,
Thermocouple 123,
Heat exchanger exhaust gas exit port 124,
Burner fuel swirler ports 125, and
Bottom plate 126.

Best Mode of Carrying out the Invention

Figure 7:
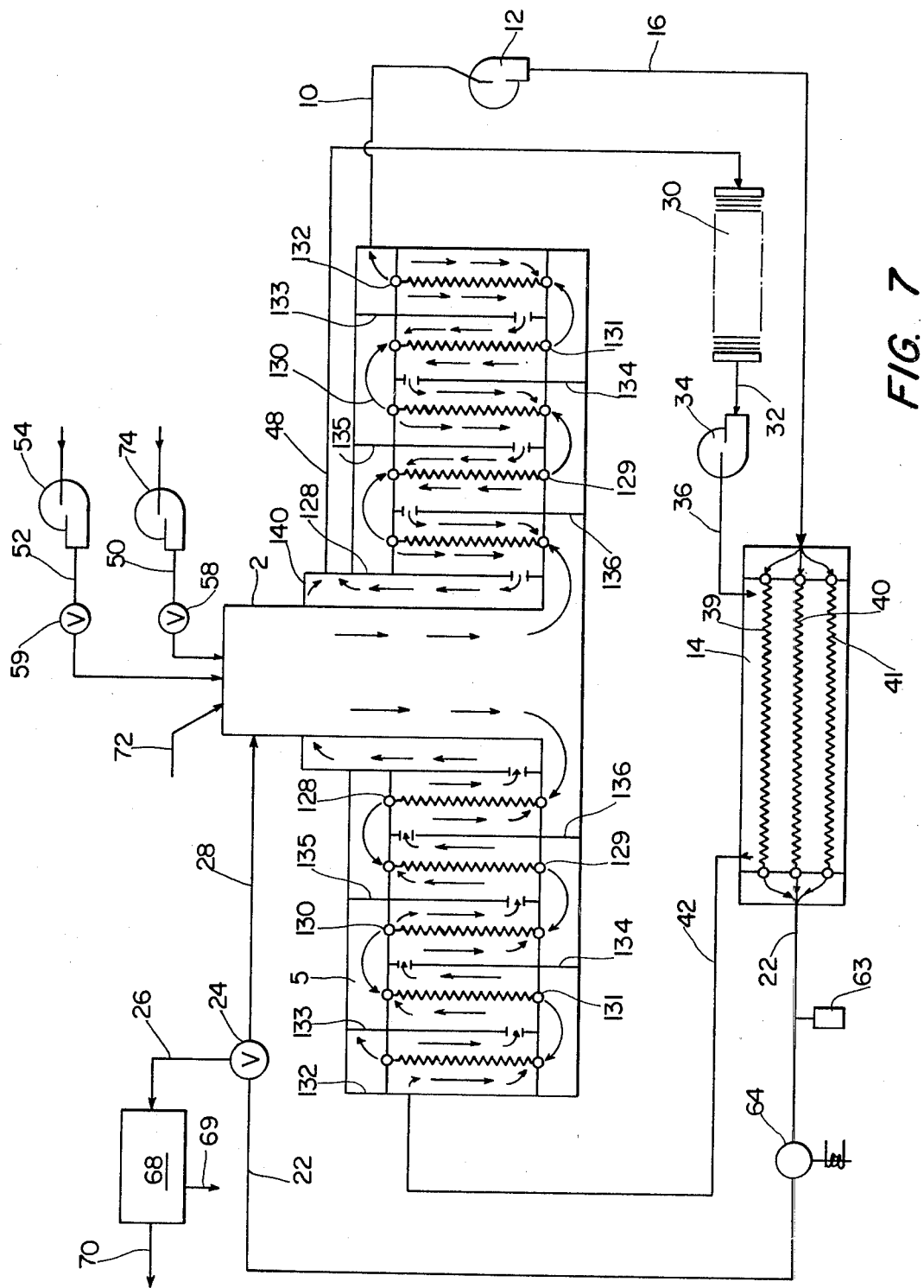
FIG. 7 is a flow diagram of the present invention showing the operational functions of the present invention and the best mode of carrying out the invention.

The best mode of carrying out the invention is described with reference to FIG. 7 where the high pressure closed loop furnace system of the present invention is used as an improved oil or gaseous fuel fired unit for home and building heating wherein fuel is introduced by pump 54 through conduit 52 and regulator 59 to the system burner 2 in conjunction with air introduced by pump 74 through conduit 50 and regulator 58 also to the burner 2. Regulators 58 and 59 permit adjustment of the mixture ratio of fuel to air to a near stoichiometric level. A plug (ignitor) 72 is provided for ignition in the head of the burner 2.

The burning gases at high pressure pass through the burner exit 3 where they move radially outward into the expansion heat exchanger unit 5 arriving at the first concentric grouping (ring) of finned heat exchanger tubes 128. The gases pass upward at a reduction in pressure caused by total (sum) of the inner areas of the tubes being designed to be greater than the area of the burner exit 3. The gas releases heat to the tube walls as it moves through at a reducing pressure. The gases are emitted to the upper chamber of the expansion heat exchanger 5 and pass radially outward to enter the second set of concentric finned heat exchanger tubes 129 which have a total (sum) inner tube area greater than that of the first ring of tubes 128. The gases pass downward through ring 129 at reducing pressure, giving up more heat to the walls of the tubes. The gases then pass radially outward to the third, fourth and fifth rings 130, 131 and 132 in the same fashion.

At the last pass through tube ring 132 the gases will be mostly exhausted of their heat energy and will be exited through conduit 10 which connects to the exhaust gas pump 12. the cool gas is pumped up to the systems pressure by pump 12 and in turn is delivered to the accumulator 14 through line 16 where it is stored in reserve capacity. From the accumulator 14 the gases are drawn off through conduit 22 through shut-off valve 64 and past pressure safety switch 63 to relief valve 24 and through conduit 28 which returns the energy spent gases to the burner 2 where they enter to mix with fresh burning gases completing the gas cycle. When the gas system pressure reaches a preset maximum due to the admission of fresh supplies of burning fuel and air the relief valve 24 opens, vents, and closes through conduit 26 to the exhaust expansion chamber 68 dropping the exhaust gas pressure to ambient pressure. Therefrom it is vented to the atmosphere through conduit 70. conduit 69 is provided as a water drain. Pressure switch 63 is set at a maximum safety shut-down pressure and operates to shut off fuel and air pumps 54 and 74 and shut off the exhaust gas pump 12, shutting the system down as a safety measure.

The water coolant/heating loop begins at the cold return from the home/building convectors 30, passes through conduit 32 to the water circulating pump 34 through conduit 36 to the water jacket connection on accumulator 14 which absorbs heat from the stored gas in tubes 39-41. The water then passes through conduit 42 to the expansion heat exchanger 5 where it enters the water jacket compartment. The water is routed between the outer wall and baffle 133 picking up heat from the outer ring of finned gas expansion tubes 132. A series of sized ports in baffle 133 admit the water radially inward to the next passage which is between baffles 133 and 134 where the water picks up heat from the next ring of gas expansion tubes 131. Continuing in this manner, the water reaches the last baffle area 136 and then enters the burner water jacket compartment 140 through sized ports. Now at its hottest the water exits to conduit 48 where it is delivered to the hot side of the convectors 30 completing the water loop.

I claim:

1. Furnace structures having smoke and gas return, comprising:

(a) combustion chamber means generating combustion gases containing heat of combustion;
(b) heat exchanger means surrounding said combustion chamber means and directing said combustion gases away from said combustion chamber means;
(c) convector means for delivering heat to the inside of a dwelling;
(d) means for circulating heat transfer medium parallel to and contiguous with said heat exchanger means countercurrent to said combustion gases, transferring said heat of combustion and delivering said heat of combustion to said convector means including a first pump;
(e) means for recirculating a first portion of said combustion gases from said heat exchanger means to said combustion chamber means including a second pump compressing and circulating said combustion gases and a second portion of said combustion gases as waste product;
(f) means for accumulating said combustion gases from said heat exchanger means and means for circulating said heat transfer medium through said means for accumulating; and
(g) said means for recirculating including a relief valve connecting a first conduit to said combustion chamber and a second conduit to waste product.

2. The furnace structures of claim 1, wherein said combustion chamber means is a cylindrical combustion chamber.

3. The furnace structures of claim 2, wherein said heat exchanger means are baffles surrounding said combustion chamber.

4. The furnace structures of claim 3, wherein said means for circulating includes a closed loop circulating system passing through said convector means and said baffles.

5. The furnace structures of claim 4, wherein said means for accumulating is a cylindrical container with first interconnecting baffles for said combustion gases and second interconnecting baffles for said heat transfer medium.

6. The furnace structures of claim 5, further comprising means for collecting said waste product.

* * * * *